United States Patent
Bono et al.

(10) Patent No.: US 10,089,037 B1
(45) Date of Patent: *Oct. 2, 2018

(54) BLOCK ACTIVE/ACTIVE ACCESS TO DATA STORAGE SYSTEMS AT DIFFERENT LOCATIONS

(71) Applicant: EMC IP Holding Company LLC, Hopkinton, MA (US)

(72) Inventors: Jean-Pierre Bono, Westborough, MA (US); Scott W. Keaney, Dedham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,675

(22) Filed: Oct. 29, 2013

(51) Int. Cl.
*G06F 12/00* (2006.01)
*G06F 3/06* (2006.01)

(52) U.S. Cl.
CPC ............ *G06F 3/0649* (2013.01); *G06F 3/067* (2013.01); *G06F 3/0619* (2013.01)

(58) Field of Classification Search
CPC ....... G06F 3/067; G06F 3/0647; G06F 3/0635
USPC ......................................................... 711/162
See application file for complete search history.

(56) References Cited

U.S. PATENT DOCUMENTS

| | | | |
|---|---|---|---|
| 8,261,068 B1* | 9/2012 | Raizen et al. | 713/165 |
| 2003/0101228 A1* | 5/2003 | Busser | G06F 3/0601 709/214 |
| 2007/0208882 A1* | 9/2007 | Corrigan | G06F 9/544 710/3 |
| 2008/0183777 A1* | 7/2008 | Xi et al. | 707/205 |
| 2010/0049917 A1* | 2/2010 | Kono et al. | 711/114 |
| 2012/0166736 A1* | 6/2012 | Yamamoto et al. | 711/147 |
| 2012/0284309 A1* | 11/2012 | Adkins | G06F 17/3038 707/782 |

* cited by examiner

*Primary Examiner* — Prasith Thammavong
(74) *Attorney, Agent, or Firm* — Krishnendu Gupta; Jason A. Reyes

(57) ABSTRACT

There is disclosed a method for use in managing data storage. In one embodiment, the method comprises operating storage processors of respective data storage systems at different location. The storage processors comprising a distributed data manager and an IO stack arranged within the storage processor such that the distributed data manager can receive a LUN outputted by the IO stack. The method further comprises distributed data managers receiving LUNs outputted by their corresponding IO stacks, controlling LUN output and providing LUN output that enables active-active access to the storage systems at the respective different locations.

15 Claims, 5 Drawing Sheets

BLOCK ACTIVE/ACTIVE ACCESS TO DATA STORAGE SYSTEMS AT DIFFERENT LOCATIONS

TECHNICAL FIELD

The invention relates generally to managing data storage, and more particularly to block active/active access to data storage systems at different locations.

BACKGROUND OF THE INVENTION

Block-based data storage systems conventionally include programming and hardware structures to provide block-based access to storage volumes. Such systems may support Fibre Channel, iSCSI (Internet Small Computer System Interface), and/or other block-based protocols. With block-based protocols, a data storage system may receive IO (input/output) requests from "hosts," i.e., computing devices accessing the data storage system, where the IO requests specify locations to be read from or written to in the form of LUN identifiers (logical unit number, or volume) and particular offset ranges relative to the LUN. IOs that specify read requests map the specified LUNs and offsets to particular locations on disk drives or electronic flash drives, reads the data stored at the mapped locations, and returns the data to the hosts. IOs that specify write requests perform similar mappings, but write the data to the designated locations. The IO requests may return results indicating whether the write requests succeeded or failed. An example of a block-based data storage system is the CLARiiON® system from EMC Corporation of Hopkinton, Mass.

File-based data storage systems include programming and hardware structures to provide file-based access to file systems. File-based data storage systems are sometimes referred to as NAS (Network Attached Storage) systems. Such systems typically support NFS (Network File System), CIFS (Common Internet File System), SMB (Server Message Block), and/or other file-based protocols. With file-based protocols, hosts can issue read and write IO requests by specifying particular file systems, paths, and file names. Internally to the data storage system, file system directories map the files specified by the host IOs to particular sets of blocks on internal volumes, which themselves are derived from disk drives or electronic flash drives. The data storage system accesses the mapped locations and performs the requested reads or writes. An example of a file-based data storage system is the Celerra® system from EMC Corporation of Hopkinton, Mass.

Distributed storage system equipment provides what may be known as data federation. An example of such data federation equipment for block-based distributed storage is the VPLEX® system from EMC Corporation of Hopkinton, Mass.

SUMMARY OF THE INVENTION

There is disclosed a computer-implemented method, comprising: operating a first storage processor of a first data storage system at a first location, the first storage processor comprising a first distributed data manager and a first IO stack arranged within the first storage processor such that the first distributed data manager can receive a LUN outputted by the first IO stack; operating a second storage processor of a second data storage system at a second location, the second storage processor comprising a second distributed data manager and a second IO stack arranged within the second storage processor such that the second distributed data manager can receive a LUN outputted by the second IO stack; receiving, by the first and second distributed data managers, LUNs outputted by their corresponding IO stack; in response to receiving the LUNs, controlling, by the first and second distributed data managers, LUN output; and providing, by the first and second distributed data managers, LUN output that enables active-active access to the first and second storage systems at the respective first and second locations.

There is also disclosed an apparatus, comprising: one or more processors; and a computer-readable medium storing instructions for execution by the one or more processors, the instructions comprising instructions to: operate a first storage processor of a first data storage system at a first location, the first storage processor comprising a first distributed data manager and a first IO stack arranged within the first storage processor such that the first distributed data manager can receive a LUN outputted by the first IO stack; operate a second storage processor of a second data storage system at a second location, the second storage processor comprising a second distributed data manager and a second IO stack arranged within the second storage processor such that the second distributed data manager can receive a LUN outputted by the second IO stack; receive, by the first and second distributed data managers, LUNs outputted by their corresponding IO stack; in response to receiving the LUNs, control, by the first and second distributed data managers, LUN output; and provide, by the first and second distributed data managers, LUN output that enables active-active access to the first and second storage systems at the respective first and second locations.

There is further disclosed a computer program product having a non-transitory computer-readable medium storing instructions, the instructions, when carried out by one or more processors, causing the one or more processors to perform a method of: operating a first storage processor of a first data storage system at a first location, the first storage processor comprising a first distributed data manager and a first IO stack arranged within the first storage processor such that the first distributed data manager can receive a LUN outputted by the first IO stack; operating a second storage processor of a second data storage system at a second location, the second storage processor comprising a second distributed data manager and a second IO stack arranged within the second storage processor such that the second distributed data manager can receive a LUN outputted by the second IO stack; receiving, by the first and second distributed data managers, LUNs outputted by their corresponding IO stack; in response to receiving the LUNs, controlling, by the first and second distributed data managers, LUN output; and providing, by the first and second distributed data managers, LUN output that enables active-active access to the first and second storage systems at the respective first and second locations.

BRIEF DESCRIPTION OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

A unified data path architecture for data processing in a data storage system combines both block-based and file-based functionality. This simplifies design and maintenance and allows a common set of functions to be applied to both block-based and file-based objects. The architecture also enables an increase in storage utilization by reallocating storage units used for block-based objects to file-based objects, and vice-versa, thereby reducing or completely eliminating stranded storage.

U.S. patent application Ser. No. 13/828,322 filed on 14 Mar. 2013 and assigned to EMC Corporation describes the unified data path architecture, and the disclosure therein is hereby incorporated herein by reference in its entirety.

Figure 1:
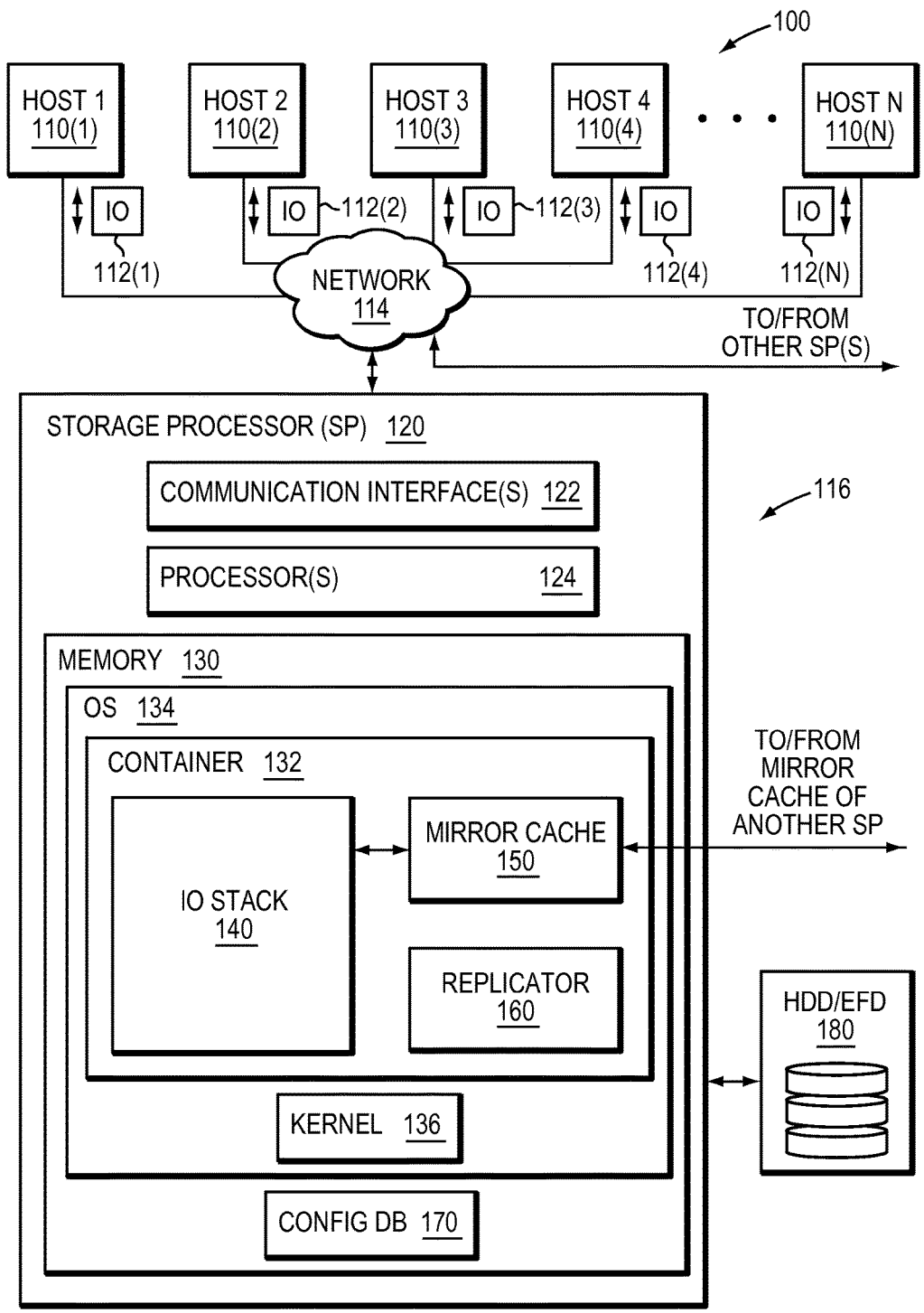
FIG. 1 is a block diagram showing an example storage processor of a data storage system in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. Although not shown in FIG. 1, the data storage system 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the hosts 110 can connect to the SP 120 using Fibre Channel (e.g., through a SAN). The SP 120 is configured to receive IO requests 112(1-N) and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)). The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage system 116, such as on a disk drive separate from the SP 120 but accessible to the SP 120, e.g., over a backplane or network.

In operation, the hosts 110(1-N) issues IO requests 112(1-N) to the data storage system 116. The SP 120 receives the IO requests 112(1-N) at the communication interfaces 122 and passes the IO requests to the IO stack 140 for further processing. The processing may include caching data provided with any write IO requests to the mirror cache 150, which may in turn cache the data to another SP. Also, mapping operations map LUNs to underlying files stored in a set of internal file systems. Host IO requests received for reading and writing LUNs are thus converted to reads and writes of respective files. The IO requests then propagate through the stack and the commands are executed for reading and/or writing the physical storage 180.

Figure 2:
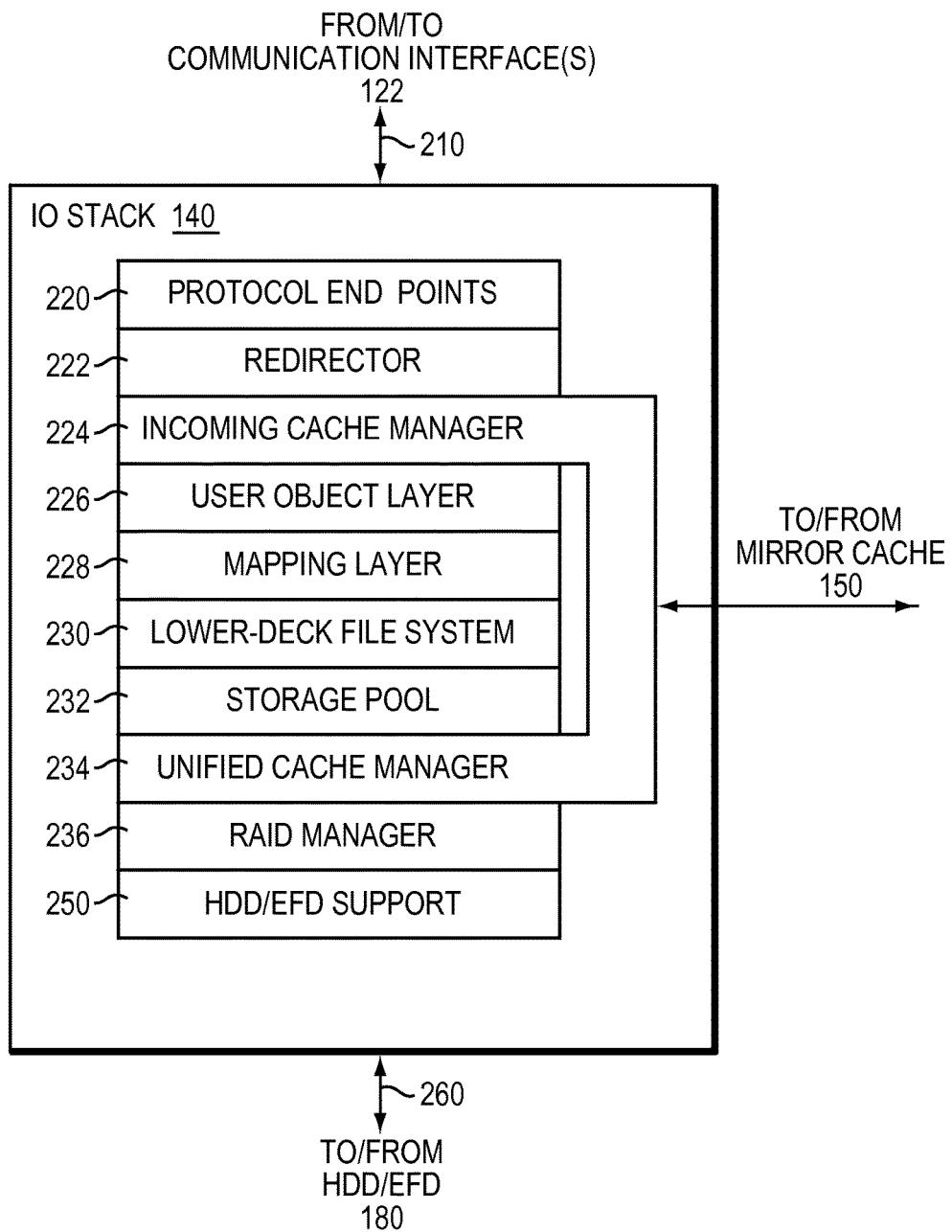
FIG. 2 is a block diagram showing particular example features of the storage processor of FIG. 1, including an IO stack.

FIG. 2 shows the IO stack 140 in additional detail. Here, the IO stack 140 is seen to include protocol end points 220, a redirector 222, an incoming cache manager 224, a user object layer 226, a mapping layer 228, one or more lower-deck (internal) file systems 230, a storage pool 232, a unified cache manager 234, a RAID (Redundant Array of Independent Disks) manager 236, and hard disk drive/electronic flash drive support 250.

The protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage system 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage system, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN), but such destaging may be conducted when convenient and out of band with the processing of host IOs. Processing continues to the incoming user object layer 226.

The user object layer 226 presents underlying files representing LUNs in a form recognized by the hosts (i.e., as LUNs). For example, the user object layer 226 presents data stored in underlying files for block-based data as LUNs.

Additionally, it should be appreciated that the user object layer 226 of the type of stack as described herein can also present data stored in underlying files for file-based data as host file systems. This aspect will not be described in any detail in this particular disclosure.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN.

The lower-deck file system layer 230 represents LUNs in the form of files. Any number of lower-deck file systems 230 may be provided. In one arrangement, a single lower-deck file system 230 may be provided to include any number of LUNs, as well as their snaps (i.e., point-in-time copies). In another arrangement, a different lower-deck file system is provided for each primary object to be stored, i.e., for each LUN. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
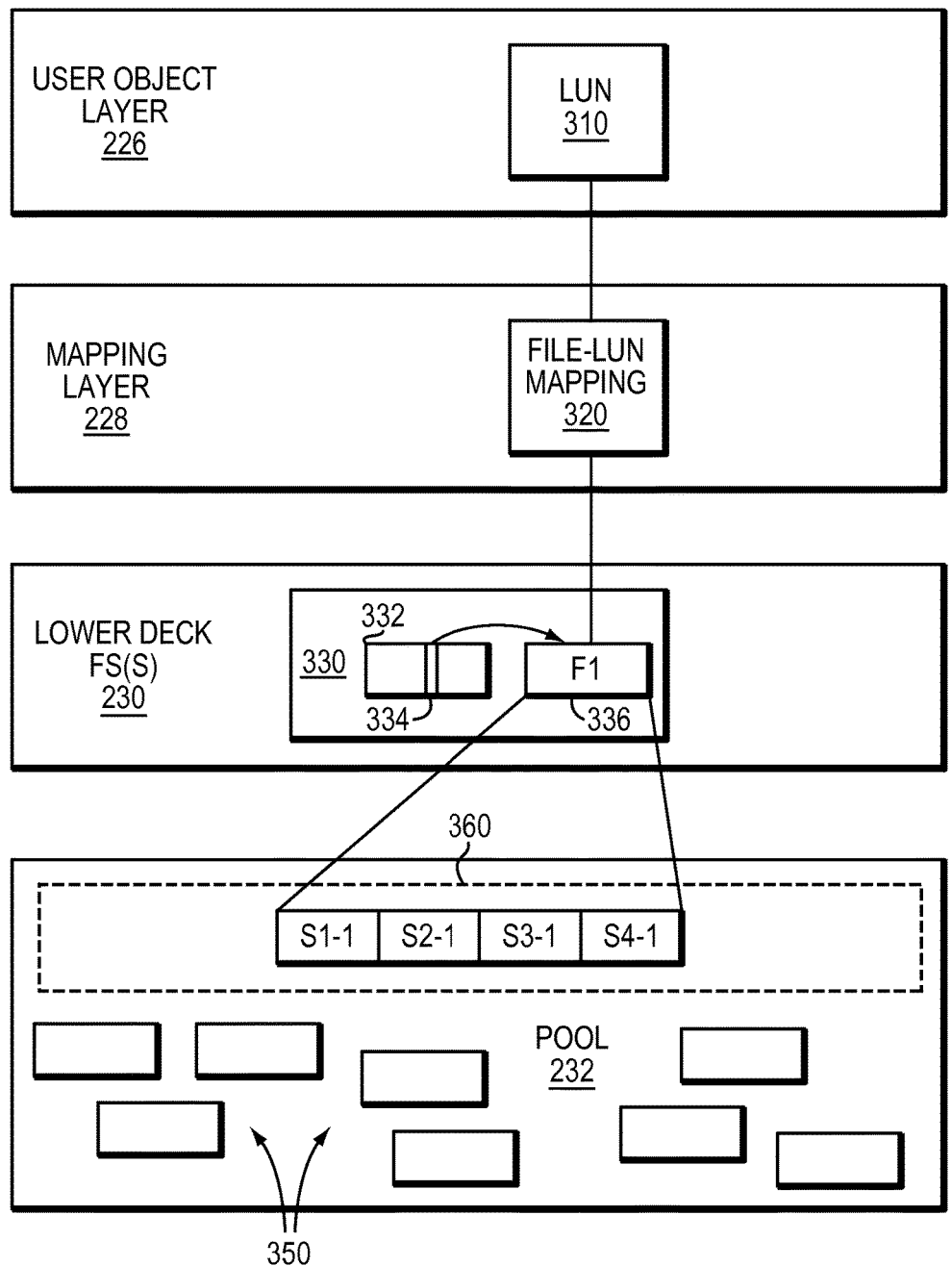
FIG. 3 is a block diagram showing example features of FIG. 2 in additional detail, including lower-deck file systems built upon storage units (e.g., slices) from a storage pool.

FIG. 3 shows portions of the front end 142 in additional detail. Here, the user object layer 226 includes a representation of a LUN 310, and the mapping layer 228 includes a file-to-LUN mapping 320. The file-to-LUN mapping 320 maps the LUN 310 to a first file F1 (336). Through the file-to-LUN mapping 320, any set of blocks identified in the LUN 310 by a host IO is mapped to a corresponding set of blocks within the first file 336.

The first file 336 is included within the lower-deck file systems 230. In this example, a first lower-deck file system 330 includes the first file 336. The lower-deck file system 330 includes an inode table 332. The inode table 332 provides information about files in respective lower-deck file systems in the form of inodes. For example, the inode table 332 of the first lower-deck file system 330 includes an inode 334, which provides file-specific information about the first file 336. The information stored in the inode includes location information (e.g., block locations) where the respective file is stored, and may thus be accessed as metadata to identify the locations of the file 336.

Although a single file is shown for each of the lower-deck file system 330, it is understood that the lower-deck file system 330 may include any number of files, each with its own entry in the respective inode table. In one example, each lower-deck file system stores not only the file F1 for the LUN 310, but also snaps of those objects. For instance, the first lower-deck file system 330 stores the first file 336 along with a different file for every snap of the LUN 310.

As shown, a set of slices 360 is allocated by the storage pool 232 for storing the first file 336 and the second file 346. In the example show, slices S1-1 through S4-1 are used for storing the first file 336. The data that make up the LUN 310 are thus stored in the slices S1-1 through S4-1. In an example, the storage pool 232 allocates slices 350 to the file system 230 in an on-demand manner, e.g., as the first file 236 requires additional storage. The storage pool 232 can also deallocate slices from the file system 230 when all the currently allocated slices are no longer required.

In some examples, the lower-deck file systems 330 is associated with a respective volume, such as a sparse LUN. Sparse LUNs provide an additional layer of mapping between the lower-deck file system 230 and the pool 232 and allow the lower-deck file system to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4:
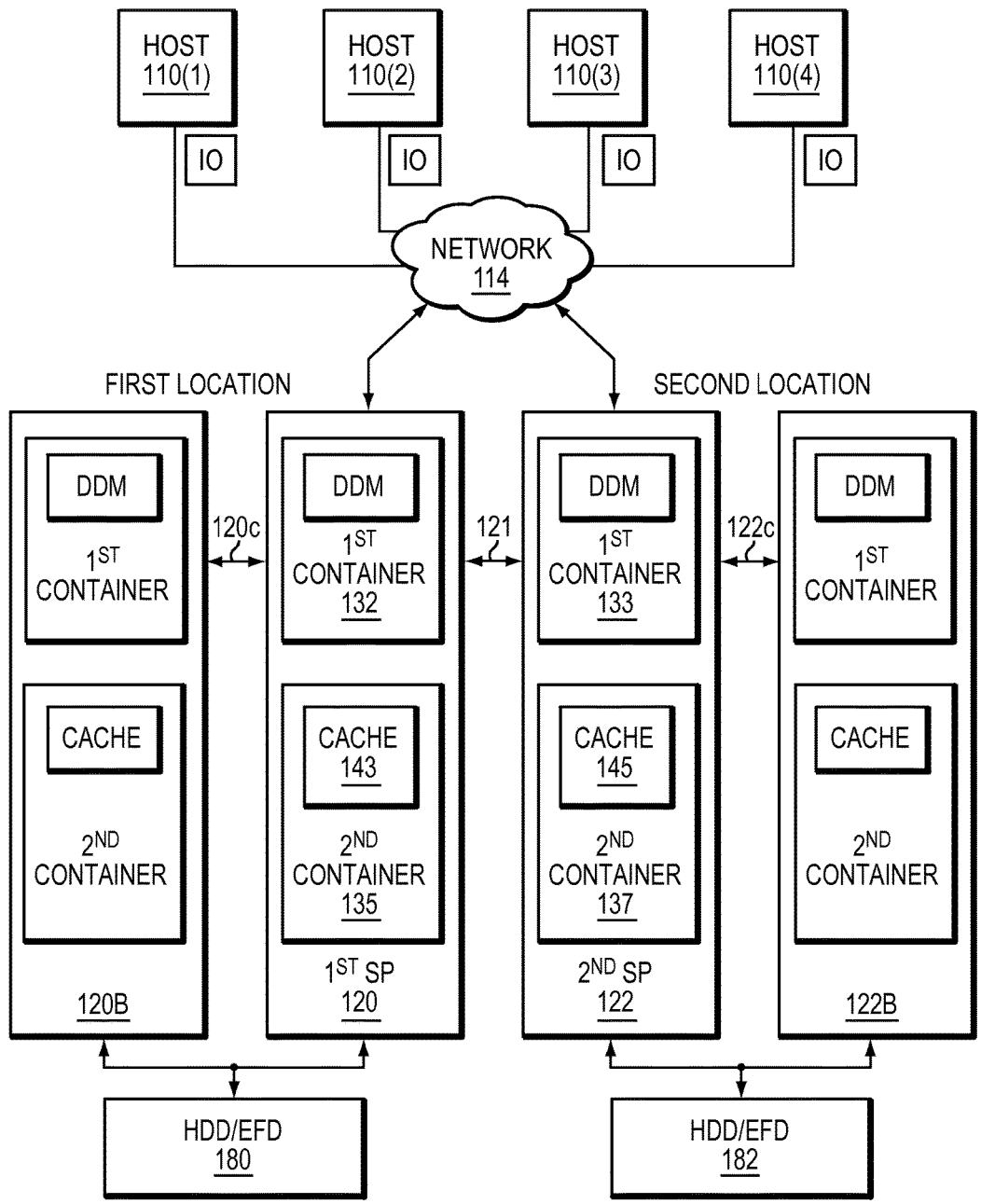
FIG. 4 is a block diagram of an example arrangement of multiple storage processors managing data storage.

FIG. 4 is a block diagram of an example arrangement of multiple storage processors for managing data storage. Here, a first storage processor (SP) 120 (i.e., the same SP as in FIG. 1) is shown coupled to HDD/EFD 180 (i.e., the same as in FIG. 1) at a first location (also referred to as a site). The SP 120 has a companion SP 120B, which is also coupled to the HDD/EFD 180. The SP 120B may be provided alongside the SP 120 in a single cabinet of the data storage system 116 and connected to the SP 120 via an interconnect 120c, such as a PCI Express cable, for example.

The SP 120 is seen to include a first container 132 (i.e., the same as in FIG. 1) and a second container 135. Each container provides an isolated userspace instance. Operating within the first container 132 is a distributed data manager (DDM). Operating within the second container 135 is IO stack, e.g. similar to the stack 140 shown in FIGS. 1 and 2. The $2^{ND}$ container 135 includes a cache 143. The arrangement of the SP 120 as shown in FIG. 4 may be regarded as an integrated deployment.

At the second location, a second SP 122 is shown coupled to HDD/EFD 182. The SP 122 has a companion SP 122B, which is also coupled to the HDD/EFD 182. The SP 122B may be provided alongside the SP 122 in a single cabinet of a data storage system at the second location and connected to the SP 122 via an interconnect 122c.

The second SP 122 is configured with first and second containers 133 and 137, respectively, where the container 137 includes a cache 145. The second SP 122 is configured in a similar manner to the SP 120.

The first location may be local to or remote from the second location. For example, the first and second locations may be different locations within the same room or building, or they may be geographically separated locations, such as in different buildings, which may be on different streets or different cities. In an example, the data storage system 116 at the first location is connected to the data storage system at the second location via the network 114. The data storage systems may also be connected using connection 121 (alternatively, the connection 121 may be considered to be part of the network 114).

In one example, the SPs 120 and 120B are part of a first local cluster of SPs, which may also include additional SPs (not shown) at the first location. The SPs 122 and 122B are part of a second local cluster of SPs, which may also include additional SPs at the second location. The first and second local clusters may together be regarded as forming a wide area cluster, i.e., a metro cluster.

DDMs in the first containers can be VPLEX products available from EMC Corporation of Hopkinton, Mass. The DDMs may be used to enable the resources of the two disparate data storage systems at the first and second locations to be federated and/or coordinated and utilized as a single pool of virtual storage. The DDMs may also allow for logical storage units (e.g., logical unit numbers (LUNs)), provisioned from various storage systems, to be managed through a centralized management interface. The DDMs also provide for data mobility, availability and collaboration through active/active data over synchronous and asynchronous distances. With an active/active arrangement, hosts may have IO access to the storage systems at both locations.

The arrangement of the DDMs in dedicated containers at the front end of the storage processors allows the UDA stacks to communicate with the DDMs through a set of APIs. The DDMs can consume the local and remote LUNs presented by the UDA front-ends and present distributed LUNs (e.g., VPLEX LUNs) over the two locations. Such an arrangement enables block active/active access to the data storage systems at the respective different locations.

The arrangement of the DDMs in the first containers also enables the DDMs to be hidden to the end-users for ease of management with respect to LUN lifecycle management. For example, if the user is applying block deduplication on a virtualized LUN, the corresponding action is also applied internally to both UDA LUNs on the data storage systems. Furthermore, all of the UDA's data services such as block deduplication, block compression, auto-tiering, may also be leveraged.

DDMs in each SP in the metro cluster operate in coordination with one another to perform several functions as discussed above. Described in the following paragraphs are just two functions provided by such coordination. For example, the DDMs can provide cache coherency by ensuring that the metro cluster maintains a record of any changes to cache on the first SP, such that the state of the cache on the first SP may be duplicated on the second SP in the event of a failure of the first SP. The DDMs also provide for data mirroring. An example data mirroring sequence is described with respect to FIG. 4. It will be understood that the example of data mirroring described below is with regard to host data. The example comprises the following steps.

Step (1) comprises the first SP 120 receiving a block-based IO request. In an example, the block-based host IO request specifies data to be written to an identified LUN. The IO request is passed to the DDM in the first container 132. Step (2) comprises the DDM in the first SP 120 initiating a mirroring operation by directing the IO request 1110 to a DDM running on the second SP 122 at the second location. Step (3), the DDM in the first container 133 on the second SP 122 passes the IO request to the IO stack in the second container 137 and caches the data associated with the IO request in the cache 145. Step (4), the IO stack in the second container 137 sends an acknowledgement to the DDM in the first container 133 on the second SP 122 that the designated data have been stored. In some examples, the acknowledgement is delayed until the second SP 122 locally mirrors the received data to its companion SP 122B, e.g., over the connection 122c. Step (5), the DDM in the first container 133 on the second SP 122 sends an acknowledgement to the DDM in the first container 132 on the first SP 120 acknowledging that the data associated with or designated by the IO request 1110 have been remotely stored. Step (6), the DDM in the first container 133 on the first SP 120 passes the data to the IO stack in the second container 135 on the first SP 120 and the cache 143 stores the data designated in the IO request. Step (7), the cache 143 stores the designated data and an acknowledgement is sent from the IO stack in the second container 135 to the DDM in the first container 132 on the first SP 120 confirming that the data designated by the first IO request 1110 has been persisted. In some examples, the acknowledgement is delayed until the first SP 120 locally mirrors the received data to its companion SP 120B, e.g., over the connection 120c. With the acknowledgement received in the first container 132, the operating system of the SP 120 receives the prompt acknowledgement that it requires and may proceed with additional processing. Step (8), the first SP 120 sends an acknowledgement to the host that originated the IO request to confirm that the write has been executed.

In addition to storing the designated data in volatile memory, the SPs 120 and 122 also stores the data in the HDD/EFD 180 and the HDD/EFD 182, respectively. However, storage of the data to the HDD/EFD 180 and the HDD/EFD 182 may happen without particular timing constraints, as the data have already been persisted and the operating system of the SP 120 has received the confirmation it requires to proceed.

Storing data to the HDD/EFD 180 and the HDD/EFD 182 is considerably slower than storing data to the caches 143 and 145, even when accounting for transmission delays between the first SP 120 and the second SP 122. The delays in storing data to the HDD/EFD 180 and the HDD/EFD 182 derive primarily from among other things writing the data to a relatively slow (typically magnetic) medium.

Advantageously, it should be appreciated that the above arrangement can provide block active/active access to the data storage systems at the respective different locations by providing two optimized paths to the hosts (i.e., one on the source system at the first location and one at the destination system at the second location). The DDMs establish a distributed RAID1 across the data storage systems for each LUN so that if one site goes down the entire set of LUNs can still be made available on the remaining site entirely transparently to the hosts. The DDMs also preserve the LUN identities across the data storage systems.

Advantageously, the above arrangement also embeds the DDMs (e.g., VPLEX technology) in the processors with the UDA stack, thereby minimizing footprint through hardware consolidation.

Figure 5:
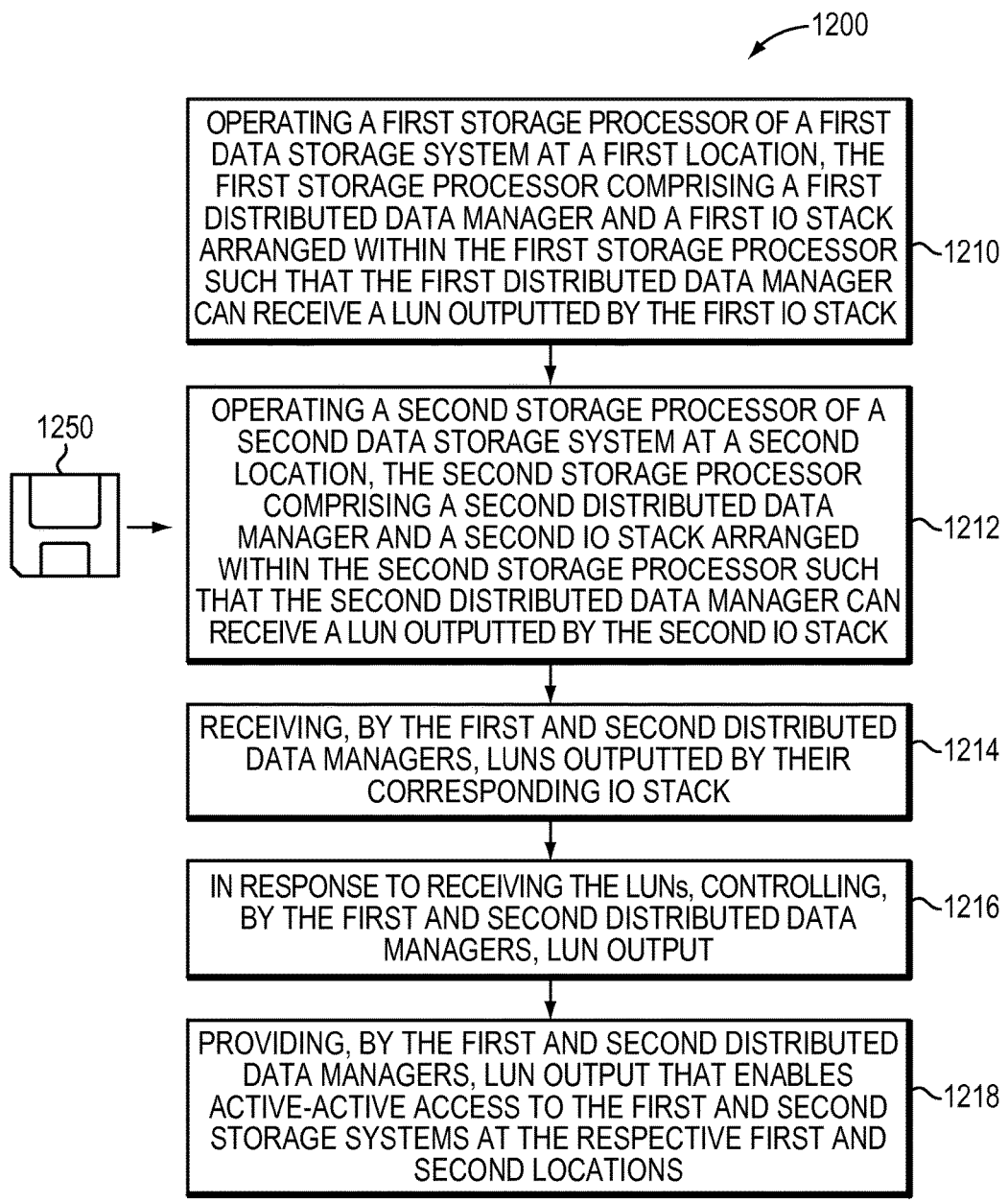
FIG. 5 is a flowchart showing an example process for managing data storage.

FIG. 5 shows an example method 1200. The method 1200 is typically performed by the software constructs as shown in FIGS. 1, 2, and 4. The various acts of the method 1200 may be ordered in any suitable way. Accordingly, embodiments may be constructed in which acts are performed in orders different from those illustrated, which may include performing some acts simultaneously, even though the acts are shown as sequential in the illustrated embodiments.

FIG. 5 shows an example method 1200 of managing data storage. The method 1200 may be performed in connection with the arrangement shown in FIG. 4.

At step 1210, the step comprises operating a first storage processor of a first data storage system at a first location. The first storage processor comprising a first distributed data manager and a first IO stack arranged within the first storage processor such that the first distributed data manager can receive a LUN outputted by the first IO stack. It should be appreciated from the previous figure that the first distributed data manager can be arranged in a container at a front end of the first storage processor such that a LUN outputted by the IO stack can be received by the first distributed data manager.

At step 1212, the step comprises operating a second storage processor of a second data storage system at a second location. The second storage processor comprising a second distributed data manager and a second IO stack arranged within the second storage processor such that the second distributed data manager can receive a LUN outputted by the second IO stack. It should be appreciated that the second distributed data manager can be arranged in a container at a front end of the second storage processor in an arrangement that enables a LUN outputted by the IO stack to be received by the second distributed data manager.

At step 1214, the step comprises receiving LUNs provided from the first IO stack and the second IO stack. LUNs are outputted by the first and second IO stacks in the first and second storage processors and received by the corresponding first and second distributed data managers in the first and second storage processors.

At step 1216, the step comprises controlling LUN output in response to receiving the LUNs. DDMs control the LUN output such that the LUN output provides a one-to-one relationship with the LUNs received by the DDMs. DDMs also ensure that LUN identity is preserved across the data storage systems at the respective first and second locations.

At step 1218, the step comprises providing LUN output that enables active-active access to the first and second storage systems at the respective first and second locations. It should be noted that the LUN output provides two optimized paths to the hosts: one on the system at the first location and one on the system at the second location.

Notwithstanding the above, it should be understood that in the case of an SP failure at one of the first and second locations, the host traffic will be directed to the other site and locally the objects will be brought back up on the remaining SP to allow the DDMs to resume internal mirroring traffic.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 1250 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A computer-implemented method, comprising:
   operating an IO (Input/Output) stack within a first storage processor (SP) of a first data storage system at a first location, the IO stack operating within the first SP including (i) a first container including a first distributed data manager (DDM) and (ii) a second container including a mapping layer, the first DDM in the first container receiving a LUN served by one or more storage devices via the mapping layer in the second container and providing a host-accessible LUN;
   operating an IO stack within a second SP of a second storage system at a second location, the IO stack operating within the second SP including a second distributed data manager (DDM) co-operating with the first DDM to establish a distributed RAID1 across the storage systems for the host-accessible LUN such that the host-accessible LUN is active-active at the respective first and second locations with LUN identity preserved across the first and second storage systems such that if one of the first or second storage system fails the host-accessible LUN is available at the other storage system at the other location; and
   accessing the host-visible LUN at one or both of the first and second storage systems at the respective first and second locations to service IO requests received from at least one host;
   wherein the first container is a first software process running on an operating system kernel of the first SP and providing a first isolated userspace environment on the first SP;
   wherein the second container is a second software process running on the operating system kernel of the first SP and providing a second isolated userspace environment on the first SP; and
   wherein the first container and the second container communicate with each other using inter-process communication (IPC) within the first SP.

2. The method as claimed in claim 1, wherein LUN output provided by the distributed data managers provides at least two optimized paths to a host.

3. The method as claimed in claim 1, wherein LUN output provided by the distributed data managers provides a one-to-one relationship with the LUNs received by the distributed data managers.

4. The method as claimed in claim 1, wherein the distributed data managers are embedded in their respective storage processors.

5. The method as claimed in claim 1, wherein the distributed data managers and the IO stacks operate in containers that provide an isolated userspace instance in the respective storage processors, further wherein the IO stacks provide a unified data path architecture for data processing in the respective data storage systems that combines both block-based and file-based functionality.

6. An apparatus, comprising:
   one or more processors; and
   a computer-readable medium storing instructions for execution by the one or more processors, the instructions comprising instructions to:
   operate an IO (Input/Output) stack within a first storage processor (SP) of a first data storage system at a first location, the IO stack operating within the first SP including (i) a first container including a first distributed data manager (DDM) and (ii) a second container including a mapping layer, the first DDM in the first container receiving a LUN served by one or more storage devices via the mapping layer in the second container and providing a host-accessible LUN;
   operate an IO stack within a second SP of a second storage system at a second location, the IO stack operating within the second SP including a second distributed data manager (DDM) co-operating with the first DDM to establish a distributed RAID1 across the storage systems for the host-accessible LUN such that the host-accessible LUN is active-active at the respective first and second locations with LUN identity preserved across the first and second storage systems such that if one of the first or second storage system fails the host-accessible LUN is available at the other storage system at the other location; and
   access the host-visible LUN at one or both of the first and second storage systems at the respective first and second locations to service IO requests received from at least one host;
   wherein the first container is a first software process running on an operating system kernel of the first SP and providing a first isolated userspace environment on the first SP;
   wherein the second container is a second software process running on the operating system kernel of the first SP and providing a second isolated userspace environment on the first SP; and
   wherein the first container and the second container communicate with each other using inter-process communication (IPC) within the first SP.

7. The apparatus as claimed in claim 6, wherein LUN output provided by the distributed data managers provides at least two optimized paths to a host.

8. The apparatus as claimed in claim 6, wherein LUN output provided by the distributed data managers provides a one-to-one relationship with the LUNs received by the distributed data managers.

9. The apparatus as claimed in claim 6, wherein the distributed data managers are embedded in their respective storage processors.

10. The apparatus as claimed in claim 6, wherein the distributed data managers and the IO stacks operate in containers that provide an isolated userspace instance in the respective storage processors, further wherein the IO stacks provide a unified data path architecture for data processing in the respective data storage systems that combines both block-based and file-based functionality.

11. A computer program product having a non-transitory computer-readable medium storing instructions, the instructions, when carried out by one or more processors, causing the one or more processors to perform a method of:
operating an IO (Input/Output) stack within a first storage processor (SP) of a first data storage system at a first location, the IO stack operating within the first SP including (i) a first container including a first distributed data manager (DDM) and (ii) a second container including a mapping layer, the first DDM in the first container receiving a LUN served by one or more storage devices via the mapping layer in the second container and providing a host-accessible LUN;
operating an IO stack within a second SP of a second storage system at a second location, the IO stack operating within the second SP including a second distributed data manager (DDM) co-operating with the first DDM to establish a distributed RAID1 across the storage systems for the host-accessible LUN such that the host-accessible LUN is active-active at the respective first and second locations with LUN identity preserved across the first and second storage systems such that if one of the first or second storage system fails the host-accessible LUN is available at the other storage system at the other location; and
accessing the host-visible LUN at one or both of the first and second storage systems at the respective first and second locations to service IO requests received from at least one host;
wherein the first container is a first software process running on an operating system kernel of the first SP and providing a first isolated userspace environment on the first SP;
wherein the second container is a second software process running on the operating system kernel of the first SP and providing a second isolated userspace environment on the first SP; and
wherein the first container and the second container communicate with each other using inter-process communication (IPC) within the first SP.

12. The computer program product as claimed in claim 11, wherein LUN output provided by the distributed data managers provides at least two optimized paths to a host.

13. The computer program product as claimed in claim 11, wherein LUN output provided by the distributed data managers provides a one-to-one relationship with the LUNs received by the distributed data managers.

14. The computer program product as claimed in claim 11, wherein the distributed data managers are embedded in their respective storage processors.

15. The computer program product as claimed in claim 11, wherein the distributed data managers and the IO stacks operate in containers that provide an isolated userspace instance in the respective storage processors, further wherein the IO stacks provide a unified data path architecture for data processing in the respective data storage systems that combines both block-based and file-based functionality.

* * * * *